W. C. LOGAN.
SCREEN.
APPLICATION FILED JULY 29, 1908.
914,293.
Patented Mar. 2, 1909.
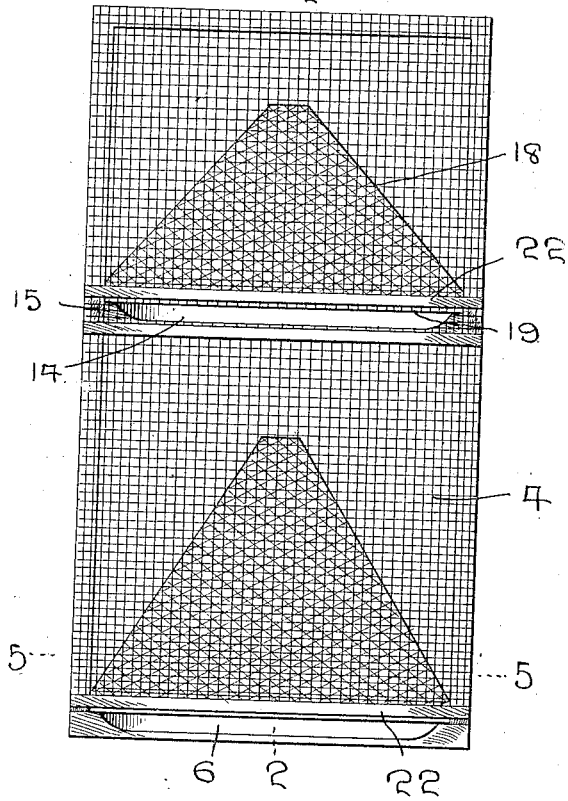
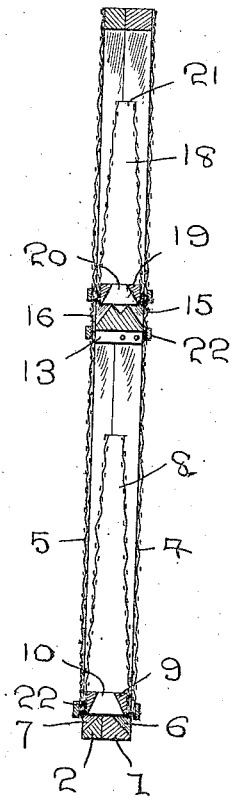
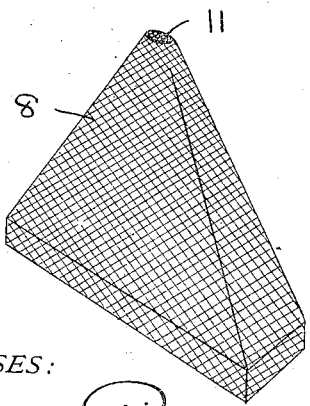
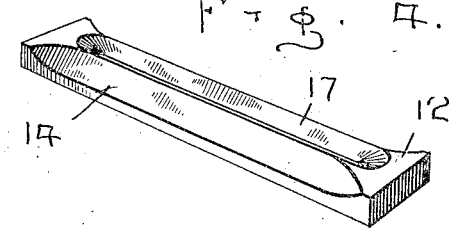
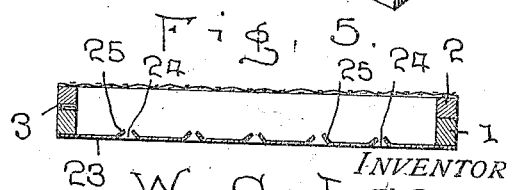
WITNESSES:
Thos. W. Riley
Ed. Head
INVENTOR
W. C. Logan
BY
W. J. FitzGerald & Co.
Attorneys

UNITED STATES PATENT OFFICE.

WILLIAM C. LOGAN, OF HEADEN, GEORGIA.

SCREEN.

No. 914,293.   Specification of Letters Patent.   Patented March 2, 1909.

Application filed July 29, 1908. Serial No. 446,000.

*To all whom it may concern:*

Be it known that I, WILLIAM C. LOGAN, a citizen of the United States, residing at Headen, in the county of White and State of Georgia, have invented certain new and useful Improvements in Screens; and I do hereby declare the following to be a full, clear, and exact description of the invention, such as will enable others skilled in the art to which it appertains to make and use the same.

My invention relates to new and useful improvements in screens and more particularly to that class adapted to be used for preventing flies or other insects from entering the doors or windows of buildings and my object is to provide a device of this class which may be hinged to the door frame and opened or closed in the usual manner.

A further object is to provide a double frame for the screen and hingedly secure the sections thereof together.

A further object is to provide screen material for each side of the frame, whereby a compartment will be formed between the two faces of the frame.

A further object is to provide inlets whereby the flies or other insects may pass between the two coverings on the frame.

A further object is to provide cone-shaped traps which will prevent the flies, etc., from escaping from the interior of the frame and a still further object is to provide a trough for retaining any suitable form of food for the insects, said trough being placed in position to cause the insects to enter the interior of the frame.

Other objects and advantages will be hereinafter referred to and more particularly pointed out in the claims.

In the accompanying drawings which are made a part of this application, Figure 1 is a side elevation of my improved screen complete. Fig. 2 is a sectional view thereof, as seen on line 2—2, Fig. 1. Fig. 3 is a perspective view of one of the cone shaped traps removed from the screen. Fig. 4 is a perspective view of the food-containing trough removed from the screen, and, Fig. 5 is a sectional view showing one face of the screen provided with a sheet metal covering.

Referring to the drawings in which similar reference numerals designate corresponding parts throughout the several views, 1 and 2 indicate the sections employed for constructing the frame of my improved screen, said sections being secured together at one edge by means of hinges 3, so that said sections may be opened or closed at will.

Secured to the outer faces of the sections 1 and 2 are strips of screen wire 4 and 5, respectively, which strips extend from end to end of the section and are secured thereto in any preferred manner. The strips of wire 4 and 5 are cut away at their lower ends and the edges of the sections 1 and 2 beveled as shown at 6 and 7, so that flies or other insects may pass between the strips of screen wire 4 and 5, said beveled portions being at the lower end of the screen and in order to prevent the flies and insects from leaving the space between the screen wires, a conical trap 8, preferably formed of screen wire, is placed between the strips 4 and 5 and is provided at its lower end with a bar 9, which rests upon the portions of the sections 1 and 2, having the beveled edges 6 and 7, the bar 9 having a tapered slot 10 therethrough, through which the flies pass in entering the traps 8, while the upper end of the trap is provided with an opening 11, through which the flies pass into the space between the wires 4 and 5 and as the diameter of said opening is only of sufficient size to allow the flies to pass through, the probability of the flies reëntering the trap through said opening is very small.

If the fly or insect should fail to enter at the lower end of the screen, I have provided a similar entrance way adjacent the upper portion of the screen and in this instance a plate 12 is introduced between the two screen sections 4 and 5, the ends thereof resting upon cleats 13, one end of each of the cleats being secured to the section 1 and extended over the section 2, the upper edges of said plate being beveled as best shown at 14, while the screen wire immediately adjacent the bevel portions is cut away to form openings 15 and 16, through which the insects may readily pass and in order to induce the flies to enter through said openings, the upper face of the plate 12 is provided with a trough or gutter 17, in which may be placed any suitable form of substance to attract the flies. The upper portion of the screen is likewise provided with a conical trap 18, the lower end of which is provided with a bar 19 having a flared slot 20 therethrough, through which the flies may readily pass into the trap, the upper end of the trap having an opening 21 similar to the opening 11 in the trap 8.

By providing the beveled sections and corresponding openings at each face of the frame formed by the sections 1 and 2, it will be readily seen that the insects may pass into the space between the two screens 4 and 5 from either side of the frame and it will likewise be seen that by providing the openings 15 and 16 towards the upper end of the screen, the insects in traveling upwardly over the strips of screen wire in their endeavor to enter or leave the building, will readily pass into the spaces between the wire sections and be retained therein until such time as it is desired to destroy or release them by opening the sections 1 and 2.

In order to prevent the edges of the wires adjacent the beveled portions from becoming bent or otherwise removed from close engagement with the bars 9 and 19 and the edges of the plate 12, strips 22 are placed across the outer surface of the screen wires 4 and 5, adjacent the openings in the screen wire, said strips being secured to the frame sections 1 and 2 in any preferred manner.

If preferred, instead of using screen wire to cover the sections 1 and 2, a portion or all of the sections may be covered with strips of sheet metal 23, said strips of sheet metal being provided with perforations 24 formed by striking in portions of the sheet metal and thereby admitting light to the interior of the frame, the tongues 25 formed by the struck-in portion, being arranged substantially conical, so that the insect will be prevented from passing outwardly through the perforations in view of the extended ends of the tongues 25.

It will thus be seen that I have provided an economical form of combined screen and trap for insects and one that can be hingedly secured in position to cover a door-way or arranged to fit windows of various sizes. It will likewise be seen that by providing the traps and placing them in the manner shown and providing openings, whereby access may be had to the interior of the screen, that the insects after passing into the screen, will be securely held until such time as they are destroyed or released and it will likewise be seen that my improved screen may be constructed as shown without materially adding to the weight thereof and at the same time maintaining the cost of the screen at the minimum.

What I claim is:

1. In a screen, the combination with a pair of frame sections hingedly secured together; of screen material for the outer faces of both sections, said screen material having openings therein, a plate having beveled edges coöperating with the openings in the screen material, the base portion of the frame sections being likewise beveled to form openings at the lower ends of the screen material, traps located above said beveled portions and means to protect the selvage edges of the screen material.

2. In a screen, the combination with a pair of frame sections hingedly secured together, screen material covering the outer faces of said sections, said material having openings therethrough to admit insects; of traps between the screen material, a plate coöperating with one of said traps, said plate having beveled edges and a trough formed therein to receive materials to attract the insects.

In testimony whereof I have signed my name to this specification in the presence of two subscribing witnesses.

WILLIAM C. LOGAN.

Witnesses:
ALEX DAVIDSON,
J. W. H. UNDERWOOD.